(12) United States Patent
Aboabdo

(10) Patent No.: US 11,730,206 B2
(45) Date of Patent: Aug. 22, 2023

(54) MANUALLY POWERED VAPORIZING DEVICE AND METHODS OF USING SAME

(71) Applicant: Chubby Gorilla, Inc., Fullerton, CA (US)

(72) Inventor: Ibrahiem H. Aboabdo, Yorba Linda, CA (US)

(73) Assignee: Chubby Gorilla, Inc., Fullerton, CA (US)

( * ) Notice: Subject to any disclaimer, the term of this patent is extended or adjusted under 35 U.S.C. 154(b) by 541 days.

(21) Appl. No.: 16/885,736

(22) Filed: May 28, 2020

(65) Prior Publication Data

US 2020/0375262 A1    Dec. 3, 2020

Related U.S. Application Data

(60) Provisional application No. 62/855,357, filed on May 31, 2019.

(51) Int. Cl.
*A24F 13/00* (2006.01)
*A24F 40/90* (2020.01)
*H02K 1/2787* (2022.01)

(52) U.S. Cl.
CPC ........... *A24F 40/90* (2020.01); *H02K 1/2787* (2022.01)

(58) Field of Classification Search
CPC ...................................................... A24F 47/00
USPC .................................................. 131/328–329
See application file for complete search history.

(56) References Cited

U.S. PATENT DOCUMENTS

| | | | |
|---|---|---|---|
| 4,360,860 A | 11/1982 | Johnson et al. | |
| 4,701,835 A | 10/1987 | Campagnuolo et al. | |
| 6,220,719 B1 | 4/2001 | Vetorino et al. | |
| 7,367,334 B2 | 5/2008 | Faison, Jr. et al. | |
| 7,431,474 B2 | 10/2008 | Mah | |
| 7,723,880 B2* | 5/2010 | Dai | H02K 7/1861 310/78 |
| 9,427,022 B2 | 8/2016 | Levin et al. | |
| 2007/0177377 A1 | 8/2007 | Ding et al. | |
| 2008/0304254 A1 | 12/2008 | Canino et al. | |
| 2014/0196732 A1* | 7/2014 | Liu | A24F 40/40 131/329 |
| 2015/0230522 A1 | 8/2015 | Horn et al. | |

(Continued)

FOREIGN PATENT DOCUMENTS

WO    WO 2009/010094 A1    1/2009

OTHER PUBLICATIONS

International Search Report and Written Opinion dated Aug. 12, 2020 in international Application No. PCT/US2020/034962.

(Continued)

*Primary Examiner* — Phuong K Dinh
(74) *Attorney, Agent, or Firm* — Knobbe Martens Olson and Bear, LLP

(57) ABSTRACT

Disclosed are embodiments of a manually powered vaporizing device including a housing having an outside surface and an opening passing through the outside surface of the housing, a tank having a fillable space therein, an atomizer, a manually powered energy generator, and an energy storage component in electrical communication with the energy generator and the atomizer. The manually powered energy generator, which can include a rotating element and/or a magnetic power generator, can be used to provide energy to the capacitor and the atomizer so that the device can be powered manually and renewably.

14 Claims, 3 Drawing Sheets

(56) References Cited

U.S. PATENT DOCUMENTS

| | | |
|---|---|---|
| 2016/0021934 A1 | 1/2016 | Cadieux et al. |
| 2016/0254708 A1 | 9/2016 | So |
| 2016/0286860 A1 | 10/2016 | Flayler |
| 2016/0334847 A1* | 11/2016 | Cameron ............... A24F 40/65 |
| 2017/0258138 A1 | 9/2017 | Rostami |
| 2017/0266397 A1 | 9/2017 | Mayle et al. |
| 2017/0360091 A1 | 12/2017 | Bless et al. |
| 2017/0367406 A1 | 12/2017 | Schuler et al. |
| 2018/0084828 A1 | 3/2018 | Phillips et al. |
| 2018/0184712 A1 | 7/2018 | Fraser et al. |
| 2018/0220702 A1 | 8/2018 | Sebastian et al. |

OTHER PUBLICATIONS www.instructables.com/id/Hand-Crank-Flashlight/ dated as available on Aug. 10, 2017 by the Wayback Machine, accessed and printed on Jun. 5, 2020.

* cited by examiner

MANUALLY POWERED VAPORIZING DEVICE AND METHODS OF USING SAME

PRIORITY CLAIM AND INCORPORATION BY REFERENCE

The present application claims priority from U.S. Patent Application No. 62/855,357 filed on May 31, 2019, titled MANUALLY POWERED VAPORIZING DEVICE AND METHODS OF USING SAME, the contents of which is hereby incorporated by reference herein in its entirety as if fully set forth herein. The benefit of priority is claimed under the appropriate legal basis including, without limitation, under 35 U.S.C. § 119(e). Any and all applications for which a foreign or domestic priority claim is identified in the Application Data Sheet as filed with the present application are hereby incorporated by reference herein in their entirety and made a part of this specification.

BACKGROUND

Field of the Disclosure

This disclosure relates to electronic vaporizing devices, more particularly, to a manually powered electronic vaporizing device.

Description of the Related Art

Unlike traditional tobacco-made cigarettes, which are ignited and pumped, the main e-cigarette vaporizing devices are atomized by electric heating, which atomizes the aroma, aroma components. The product is transformed into an aerosol state to simulate the effect of cigarette smoke, and is a product for the consumer to obtain satisfaction.

SUMMARY OF SOME EXEMPLIFYING EMBODIMENTS

Conventional vaporizing devices typically use batteries as a power source, thereby limiting the number of uses of the vaporizing device between battery recharge cycles or battery replacement. Replacing and recharging batteries can be time consuming and inconvenient, particularly when the user is traveling or is away from his or her home or office. Additionally, recharging and/or replacing the battery of a vaporizing device requires additional cords or other accessories which, if not present, can prevent the user from recharging or replacing his or her battery. Additionally, many vaporizing devices are made from non-biodegradable plastics and other materials, which can add to landfill waste and exacerbate pollution and other environmental concerns.

A more convenient and dependable solution for charging the one or more batteries or energy storage components of a vaporizing device is needed. Some embodiments of the manually powered or rechargeable vaporizing devices and/or methods disclosed herein can have a housing having an outside surface and an opening passing through the outside surface of the housing, a tank having a fillable space therein, an atomizer, an air passageway through at least a portion of the housing, the air passageway being in fluid communication with at least the tank, the atomizer, and the opening, an energy generator supported by the housing, an energy storage component supported by the housing and in electrical communication with the energy generator and the atomizer, and a rotating element configured to rotate relative to the housing. In any embodiments disclosed herein, the rotating element can be coupled with the energy generator such that a rotation of the rotating element causes a rotation of the energy generator.

Any embodiments of the manually powered or rechargeable vaporizing devices and methods disclosed herein can include, in additional embodiments, any one or more of the following features, components, and/or details, in any combination with any of the other features, components, and/or details of any other embodiments disclosed herein: wherein a rotation of the energy generator causes the energy generator to produce a first electrical current; wherein the energy storage component can be configured to store energy that is produced by the energy generator and to selectively discharge a second electrical current to the atomizer; wherein the atomizer can be configured to use the second electrical current to vaporize a liquid from the tank into a vapor that can be withdrawn through the opening; wherein the rotating element has an outside surface having a profile shape that matches a profile shape of the outside surface of the housing; wherein the housing can have a cylindrical shape, and the rotating element can have a cylindrical shape that has approximately the same outside diameter as the housing and can be approximately coaxial with the housing; including a gear box coupled with the energy generator, the gear box being configured to increase a number of revolutions of the energy generator relative to the rotating element; wherein the gear box can be configured such that one revolution of the rotating element can result in approximately two or more revolutions of the energy generator; wherein the gear box can be configured such that one revolution of the rotating element can result in approximately three to approximately eight revolutions of the energy generator; wherein the energy generator comprises a coiled motor; and/or wherein the energy generator comprises a stepper motor.

Any embodiments of the manually powered or rechargeable vaporizing devices and methods disclosed herein can include, in additional embodiments, any one or more of the following features, components, and/or details, in any combination with any of the other features, components, and/or details of any other embodiments disclosed herein: wherein the energy storage component comprises a capacitor; wherein the energy storage component comprises a supercapacitor; further comprising a charge indicator configured to indicate a level of charge within a capacitor in the device; including a resistor in electrical communication with the energy generator and the energy storage component, the resistor configured to limit a voltage from the energy generator to the energy storage component to a predetermined limit; wherein the atomizer comprises an ultrasonic vibration atomizer; wherein the atomizer comprises a heating element; wherein the tank can be refillable; wherein the housing can be made from a biodegradable material; wherein the housing can be made from a bio-plastic material; wherein the housing comprises polylactide acid; including a means for actuating the atomizer; and/or including a mouth piece in fluid communication with the air passageway.

Some embodiments of the manually powered or rechargeable vaporizing devices and/or methods disclosed herein can have a housing having at least one opening therein, a tank having a fillable space therein, an atomizer, an air passageway through at least a portion of the housing and in fluid communication with at least the atomizer and the opening, and a manually operated energy generator. Any embodiments of the manually powered or rechargeable vaporizing devices and methods disclosed herein can include, in additional embodiments, any one or more of the following features, components, and/or details, in any combination with any of the other features, components, and/or details of any other embodiments disclosed herein: wherein the device further includes an energy storage component; wherein the energy generator comprises a magnet and a solenoid; wherein the energy generator comprises a neodymium magnet; wherein the tank can be refillable; wherein the energy storage component comprises a capacitor; wherein the energy storage component comprises a supercapacitor; wherein the housing can be made from a biodegradable material; wherein the housing can be made from a bio-plastic material; wherein the housing comprises polylactide acid; including a means for actuating the atomizer; and/or further including a mouth piece in fluid communication with the air passageway.

Some embodiments of the manually powered or rechargeable vaporizing devices and/or methods disclosed herein can include producing an electrical current with an energy generator supported within a housing of the vaporizing device, wherein the energy generator can be in electrical communication with an atomizer supported by the housing, discharging the electrical current to the atomizer to vaporize a liquid within the atomizer to create a vapor, and withdrawing the vapor through an opening in the housing. Any embodiments of the manually powered or rechargeable vaporizing devices and methods disclosed herein can include, in additional embodiments, any one or more of the following features, components, details, and/or steps, in any combination with any of the other features, components, details, and/or steps of any other embodiments disclosed herein: including producing an electrical current with an energy generator supported within a housing of the vaporizing device by rotating an energy generator supported within the housing to produce the electrical current; wherein the device can be configured such that rotating the energy generator one revolution causes the energy generator to rotate at least two revolutions; wherein the device can be configured such that rotating the energy generator one revolution causes the energy generator to rotate at least four revolutions; including storing energy generated by the energy generator in a capacitor or a supercapacitor that can be in electrical communication with the energy generator and the atomizer for selective discharge to the atomizer; further including storing the liquid that can be supplied to the atomizer within a tank; and/or further including producing an electrical current with an energy generator supported within a housing of the vaporizing device by passing a magnet through a solenoid.

BRIEF DESCRIPTION OF THE DRAWINGS

Embodiments of the present disclosure will now be described hereinafter, by way of example only, with reference to the accompanying drawings in which.

DETAILED DESCRIPTION

The systems, methods and devices described herein have innovative aspects, no single one of which is indispensable or solely responsible for their desirable attributes. Without limiting the scope of the claims, some of the features of vaporizing device embodiments will now be described.

Figure 1:
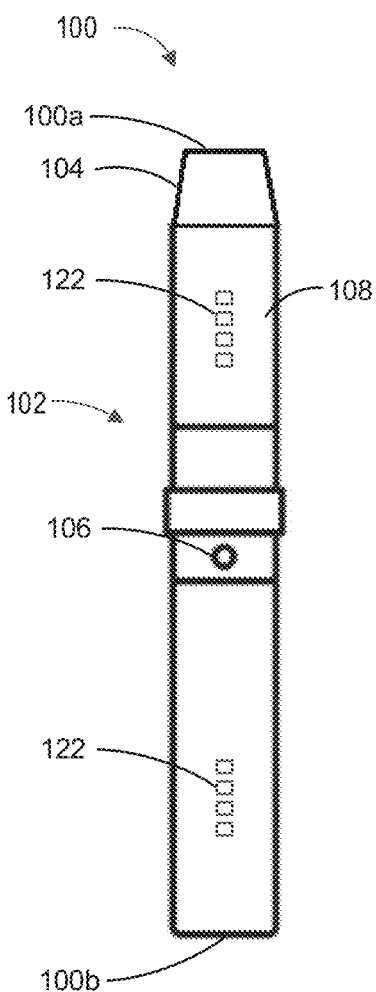
FIG. 1 shows a top view of an embodiment of a manually powered vaporizing device.

FIG. 1 shows a top view of an embodiment of a manually powered vaporizing device 100 that can have a housing 102, a mouthpiece 104 coupled with or integrally formed with the housing 102, an optional activation button 106 supported by the housing 102, and a reservoir or tank 108 removeably or nonremoveably coupled with the housing 102. The tank 108 can be refillable with a liquid substance, which can be an e-liquid substance. In some embodiments, the device can be configured to receive an interchangeable or removable cartridge containing the desired liquid. Such cartridge is also referred to herein as a tank. In any embodiments of the devices and methods disclosed herein, the liquid can be an electronic cigarette liquid that can include nicotine and/or a flavoring or can be any other suitable or desired substance. The device 100 can be configured to vaporize any desired form of substance, such as without limitation a liquid, gel, powder, solid block or brick, or otherwise. The device can also optionally have a grinder or grinding element (not shown) configured to grind large solids or pieces of solid material into smaller pieces to facilitate vaporization. The grinder 120 can include a manually rotatable portions that can reduce the size of solid material between the two rotatable portions. Any embodiments of the device 100 can also have a drip tip.

Figure 2:
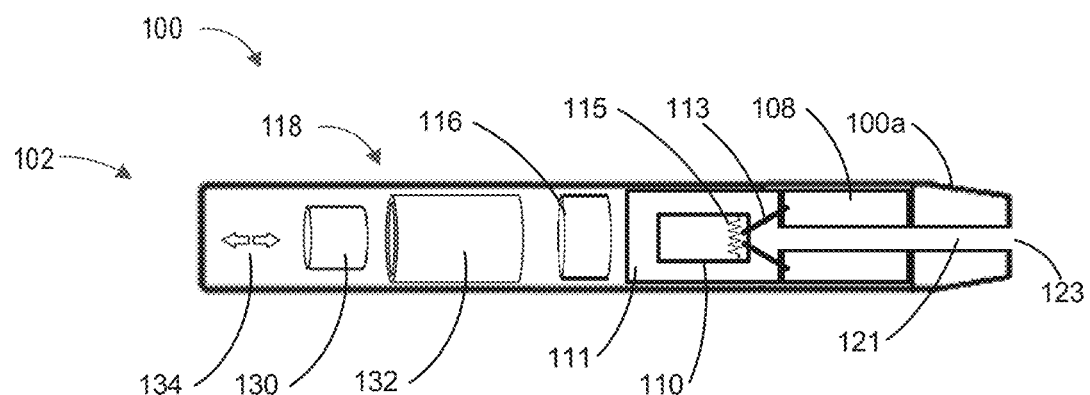
FIG. 2 shows a partial section view of the embodiment of the manually powered vaporizing device shown in FIG. 1, showing the components supported within the housing with a top portion of the housing removed for clarity.

FIG. 2 is a partial section view of the embodiment of the manually powered vaporizing device 100 shown in FIG. 1, with a top surface of the housing 102 removed for clarity to show the components that supported inside the housing 102. With reference to FIG. 2, any embodiments disclosed herein can have an atomizer 110 supported within the housing 102, within the tank 108 or, as shown, within an atomization chamber 111 supported within the housing 102. In any embodiments, the atomizer 110 can have a heating element 115 such as, without limitation, a resistive coil heating element. The heating element 115 can be electrically coupled with a power source, such as any of the embodiments of the energy generators disclosed herein.

One or more wicking elements 113 can extend from the heating element to a space within the tank 108 and can be configured to draw the liquid or pre-vaporized substance (collectively referred to herein as the liquid) from the tank 108 to the heating element so that the heating element is always supplied with the liquid. In the illustrated embodiment, the device 100 has two wicking elements 113. The wicks can be made from steel, cotton, rayon, or any other suitable or desired material. Additionally, in some embodiments, one or more passageways 121 can extend from the atomization chamber 111, through the tank 108 and through a proximal end portion 100*a* of the device 100 so as to provide a fluidic passageway between the opening 123 at the proximal end 100*a* of the device 100 and the atomization chamber 111 surrounding the atomizer 110.

In any embodiments disclosed herein, as described above, the atomizer 110 can be positioned within a chamber (such as, with limitation, the atomization chamber 111 described above). Alternatively, any embodiments disclosed herein can have a cartomizer, which can include an integrated atomizer and cartridge, which cartridge can include the liquid. The term atomizer as used within this application is meant to include any available or future developed form of an atomizer, clearomizer, or cartomizer, including high-frequency ultrasonic vibration atomizers, heating element atomizers, and any other similar or suitable devices used for vaporizing liquids and/or solids. As will be described in greater detail, any embodiments of the vaporizing devices disclosed herein can have a charge indicator, such as charge indicator 122. Further details related to the charge indicator 122 will be disclosed below. The atomizer and/or the vaporizing device of any embodiments disclosed herein can have any additional features and components that are suitable or optimal for vaping devices.

With reference to FIG. 2, which again is a partial section view of the embodiment of the vaporizing device 100, any of the embodiments of the devices disclosed herein, including the device 100 can have an energy storage component 116, which can include or be a capacitor, and an energy generator 118 to provide energy comprising an electrical current to the atomizer 110 to transform a liquid within the tank into a mist or vapor, or to vaporize a solid material, as described above. In some embodiments, the energy generator 118 can be electronically coupled with the energy storage component 116 and can include a manually operated power generator, such as the manually operated power generator that is illustrated in FIG. 2, configured to enable a user to recharge the energy storage component 116 manually and without any other cables, devices, power supplies or sources, or otherwise, thereby enabling the device to be used anytime and anywhere. This can be of great benefit to the user, and can ensure that the device will always be usable regardless of the resources and/or accessories available.

Some embodiments of the energy generator 118 can include a magnetic power generator, such as a Faraday power generator, any other linear energy generator, or other manually powered energy generator including, without limitation, a manually rotated power generator, examples of which are described below. A charge indicator 122 can be electrically coupled with the energy storage component 116 (which can be a capacitor) to provide a status or indication of a level of charge of the energy storage component 116. More details of the charge indicator are described below.

In any embodiments, the energy generator 118 can include magnet 130 that can move axially along a track or passageway through a wire coil or solenoid 132 (such as, optionally, an induction coil). The magnet 130 can be free to move along the axial path indicated by arrows 134. The magnet 130 can be moved back and forth along the travel pathway when a user moves the device 100 up and down in the direction of the arrows 134 (such as by a shaking motion), thereby causing the magnet to travel through the wire coil 132 in a repetitive motion. The energy generator 118 is configured to generate power as the magnet 130 passes through the wire coil 132. In general, the stronger the magnet, the more power can be generated with each pass of the magnet 130 or shake. The magnet 130 can optionally be a neodymium magnet or magnets or comprise neodymium to increase the power generated by the magnet, be a rare earth magnet, or otherwise.

The wire coil 132 can be located at the approximate center of the movement path of the magnet 130. A pair of elastomeric dampers can be positioned on the opposing ends of the movement path of the magnet to absorb the kinetic energy of the magnet and return the magnet in the opposite direction, thereby preserving at least a portion of the kinetic energy of the magnet 130.

The wire coil 132 can be made from copper or any other suitable material, and have any desired number of windings. The number of windings of wire in the coil 132 can affect how much power can be generated by each pass of the magnet. As mentioned, the coil 132 can be electrically coupled with the energy storage component 116 so that the energy produced by each pass of the magnet 130 through the coil can be transferred to the energy storage component 116. In some embodiments, the power generator can be configured to produce In some embodiments, the vaporizing device 100 can be configured so that the capacitor provides from 10 watts (or approximately 10 watts) to 200 watts (or approximately 200 watts) of power to the atomizer, or from 30 watts (or approximately 30 watts) to 60 watts (or approximately 60 watts), or from 40 watts (or approximately 40 watts) to 50 watts (or approximately 50 watts) or power to the atomizer, or from and to any values within the foregoing ranges. Further, the devices of any embodiments disclosed herein can be configured such that a user can adjust the amount of energy being provided to the atomizer. For example and without limitation, some embodiments of the device can have a dial, switch, or other adjustment mechanism configured to permit the user to increase or decrease the wattage provided to the atomizer.

Figure 3:
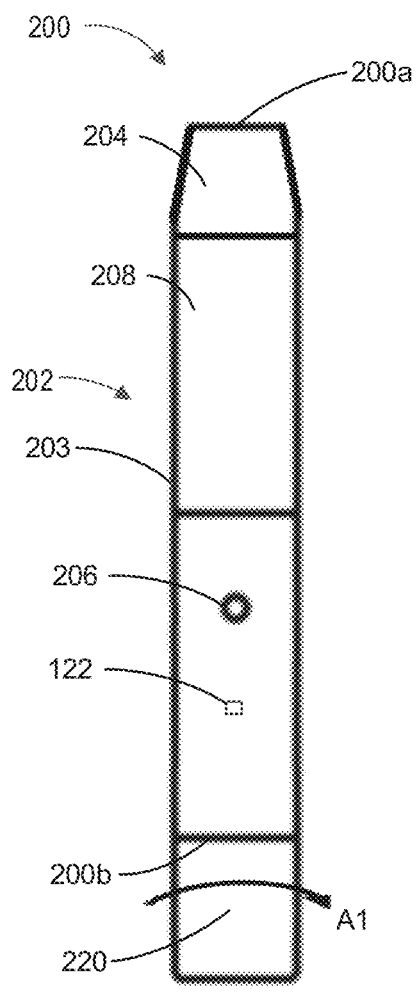
FIG. 3 shows a top view of another embodiment of a manually powered vaporizing device.
Figure 4:
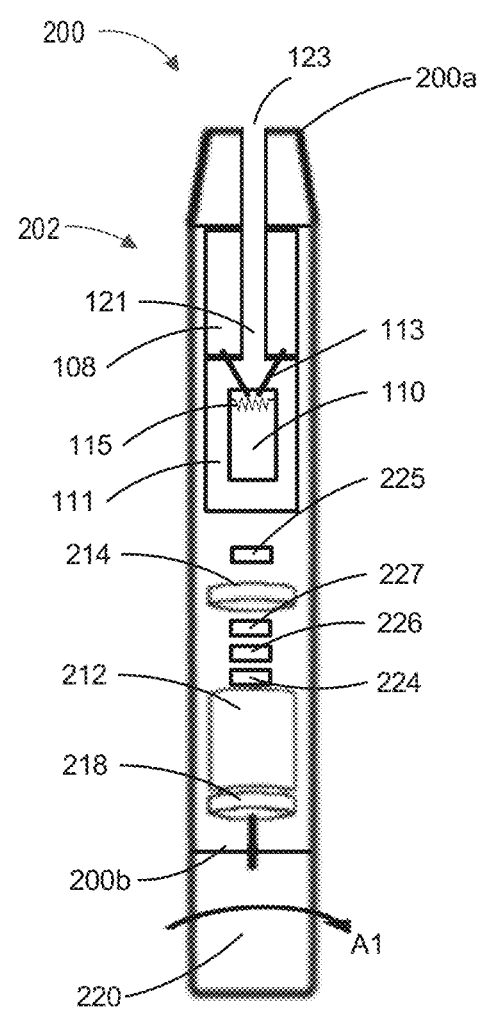
FIG. 4 shows a partial section view of the embodiment of the manually powered vaporizing device shown in FIG. 3, showing the components supported within the housing with a top portion of the housing removed for clarity.

In other embodiments of vaporizing devices disclosed herein, the vaporizing devices can include a power generator configured to produce energy by rotating the power generator. FIG. 3 shows a top view of another embodiment of a manually powered vaporizing device 200 having a manually operated energy or power generator. FIG. 4 is a partial section view of the embodiment of the manually powered vaporizing device 200 shown in FIG. 3, with a top surface of the housing 202 removed for clarity to show the components that supported inside the housing 202.

Any embodiments of the manually powered vaporizing device 200 disclosed herein can have any of the features, components, and/or other details of any of the other vaporizing device embodiments or components thereof disclosed herein, including without limitation any of the embodiments of the vaporizing device 100 disclosed herein, to form additional embodiments having any combination of any of the features, components, and/or other details disclosed herein. For example and without limitation, any of the embodiments of the vaporizing device 200 can have a reservoir or tank 108 removeably or nonremoveably coupled with the housing 202, an atomizer 110 supported within the housing 202, the atomizer being supported within the tank 108 or, as shown, within an atomization chamber 111 supported within the housing 202. In any embodiments, the atomizer 110 can have a heating element 115 such as, without limitation, a resistive coil heating element. The heating element 115 can be electrically coupled with a power source, such as any of the embodiments of the energy generators disclosed herein.

One or more wicking elements 113 can extend from the heating element to a space within the tank 108 and can be configured to draw the liquid or pre-vaporized substance (collectively referred to herein as the liquid) from the tank 108 to the heating element so that the heating element is always supplied with the liquid. In the illustrated embodiment, the device 200 has two wicks 113. Any of these components can be configured to be the same or similar to any of the embodiments of these components described above.

Similarly, any of the other embodiments of the vaporizing devices, including without limitation any of the vaporizing device 100 embodiments, can have any of the features, components, and/or other details of any of the vaporizing device embodiments 200 or components thereof disclosed herein to form additional embodiments having any combination of any of the features, components, and/or other details disclosed herein.

Figure 5:
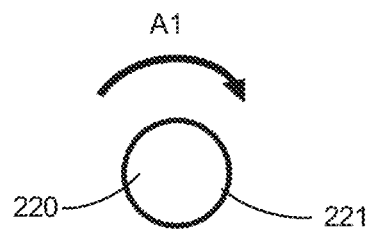
FIG. 5 shows an end view of the embodiment of the manually powered vaporizing device shown in FIG. 3.

For example and without limitation, the embodiment of the vaporizing device 200 shown in FIGS. 3-5 can include a housing 202 having an outside surface 203 and an opening at a proximal end 200a of the device 200 passing through the outside surface 203 of the housing 202. The device 200 can also have an energy generator 212 supported by the housing 202, an energy storage component 214 supported by the housing 202 and in electrical communication with the energy generator 212 and an atomizer 110, and a rotating element 220 configured to rotate relative to the housing 202. In some embodiments, the rotating element 220 can be positioned adjacent to a distal end portion 200b of the housing 202. The rotating element 220 can be coupled with the energy generator 212 such that a rotation of the rotating element 220 causes a rotation of the energy generator 212. Any embodiments can also have a reservoir or tank 208 removeably or nonremoveably coupled with the housing 202. The tank 208 can have a fillable space therein. The atomizer 110 can be supported within the tank 208, adjacent to the tank 208, in a separate atomizer chamber (such as is described above with respect to device 100), or otherwise. Additionally, similar to the device 100 described above, an air passageway can extend through at least a portion of the housing 202, the air passageway being in fluid communication with at least the atomizer 110 and/or the atomizer chamber, and the opening in the proximal end of the housing 202.

In some embodiments, the vaporizing device 200 can be configured such that a rotation of the energy generator 212 causes the energy generator 212 to produce a first electrical current, which can be provided to the atomizer and/or the energy storage component 214, which can be a capacitor. As such, the energy storage component 214 can be configured to store energy that is produced by the energy generator 212 and to selectively discharge a second electrical current to the atomizer 110. The atomizer 110 can be configured to use the second electrical current to vaporize a liquid from the tank into a vapor that can be withdrawn through the opening. In some embodiments, as shown in FIG. 5, the rotating element 220 can have an outside surface 221 having a profile shape that matches a profile shape of the outside surface 203 of the housing 202.

In some embodiments, the housing 202 can have a cylindrical shape, and the rotating element 220 can have a cylindrical shape that has approximately the same outside diameter as the housing and can be approximately coaxial with the housing 202. In other embodiments of the device 200, the rotating element 220 can include an arm and handle assembly, a larger diameter dial, or other armature or component that can increase the torque that can be applied to the energy generator and/or a gear box coupled with the energy generator 212 when the rotating element 220 is rotated. In some embodiments, the additional torque that can be generated can permit a greater rotational speed of the energy generator through a speed increasing gearbox of a higher magnitude.

In any embodiments, the energy generator 212 can include a coiled motor, such as a stepper motor. For example and without limitation, a 5V DC stepper motor can be used to generate energy for the atomizer 110 (directly, or through the capacitor and other electronic components) and/or the capacitor 214. Another example of a stepper motor that can be used with some of the embodiments disclosed herein is the Nema 17 Bipolar 2A 59 Ncm (84 oz·in) stepper motor.

Any embodiments disclosed herein can include, but are not required to include, a gear box 218 coupled with the energy generator 212. The gear box 218 can be configured to increase a number of revolutions of the energy generator 212 relative to the rotating element 220. For example and without limitation, the gear box 218 can be configured such that one revolution of the rotating element 220 can result in approximately two or more revolutions of the energy generator 212, or such that one revolution of the rotating element 220 can result in approximately three to approximately eight revolutions of the energy generator 212, or such that one revolution of the rotating element 220 can result in approximately four to approximately six revolutions of the energy generator 212, or ten, fifteen, or twenty or more revolutions of the energy generator 212, or from and to any number of revolutions in the foregoing ranges. This can increase the amount of power generated by the energy generator 212.

In some embodiments, the device 200 can be configured to such that a user can rotate the energy generator 212 at a rate of at least approximately 200 revolutions per minute (RPM), or from approximately 50 to approximately 500 RPM, from approximately 150 to approximately 300 RPM, or more than 500 RPM, or from and to any RPM values in the foregoing ranges.

In any embodiments disclosed herein, including the embodiments of the devices 100, 200 disclosed herein, the devices can include a capacitor, wherein the energy storage component can be a supercapacitor. In any other embodiments, the energy storage component can comprise one or more rechargeable batteries, such as one or more lithium ion batteries, that can be recharged by the energy generator. Further, with reference to FIG. 4, in any embodiments disclosed herein, including the embodiments of the devices 100, 200 disclosed herein, the devices can include a resistor 224 in electrical communication with the energy generator 212, the energy storage component 214, and/or the atomizer 110 to limit a voltage from the energy generator 212 to the energy storage component 214 and/or to the atomizer 110 to a predetermined limit. In the illustrated embodiment, a first resistor 224 is positioned in the electrical circuit between the energy generator 224 and the energy storage component 214 to limit a voltage from the energy generator 212 to the energy storage component 214, and a second resistor 225 is positioned in the electrical circuit between the energy storage component 214 and the atomizer 110 to limit a voltage from the energy storage component 214 to the atomizer 110. In other embodiments of the device 200, the device 200 can be configured to operate without the use of either resistors 224, 225, or can be configured to operate with only either the first resistor 224 or the second resistor 225.

Some embodiments of the device 100, 200 can further have one or more bridge rectifiers 227 to convert an AC electrical current provided by, for example and without limitation, a stepper motor, into a DC electrical current suitable for the capacitor and the atomizer. Further, in any embodiments disclosed herein, including the embodiments of the devices 100, 200 disclosed herein, the devices can include a diode 226 in electrical communication with the energy storage component 214 to prevent energy from being discharged from the energy storage component 214 back to the energy generator 212. Further, some embodiments can have a switch or actuator to allow a user to selectively control a flow of energy from the energy storage component 214 to the atomizer.

As mentioned, any embodiments of the manually powered vaporizing devices disclosed herein, including any of the vaporizing device embodiments 100, 200, can have an energy storage component (such as energy storage component 116), or one or more capacitors configured to store the energy produced by the energy generator. The capacitor(s) can be in electrical communication with the atomizer, and can be any desired size, which size can optionally depend on the power consumption requirements of the atomizer and/or other components of the device 100, the amount of energy desired to be stored between recharge cycles, and/or other factors. In any embodiments, the capacitor can be a supercapacitor. An example of a supercapacitor that can be used with any device or method embodiments disclosed herein is a 15 F, 5.6V supercapacitor by Vishay BC Components, or a 4 F-5 F supercapacitor.

In some embodiments, the energy generator, the energy storage component, and other associated electronics as described as part of any of the embodiments disclosed herein can be compiled in a module that can be adapted to couple with existing, battery powered vaporizing devices to provide the source of power for such devices in place of the existing batteries. In this configuration, some existing vaporizing devices can be retrofit to use the energy generator, the energy storage component, and other associated electronics as the power source so that the user can continue to use the other components of his or her vaporizing device.

In any embodiments disclosed herein, the atomizer can be an ultrasonic vibration atomizer, or can include a heating element. Any embodiments can include a means for actuating the atomizer, and/or can include a mouth piece in fluid communication with the air passageway. Further, in any embodiments, the tank can be refillable or can be replaceable. In some embodiments, the housing can be made from a biodegradable material, which can include a bio-plastic material. In some embodiments, the housing can comprise polylactide acid.

Some embodiments of the manually powered or rechargeable vaporizing devices and/or methods of using any of the vaporizing device embodiments disclosed herein can include producing an electrical current with an energy generator supported within a housing of the vaporizing device, wherein the energy generator can be in electrical communication with an atomizer supported by the housing, discharging the electrical current to the atomizer to vaporize a liquid within the atomizer to create a vapor, and withdrawing the vapor through an opening in the housing. The method embodiments can further include producing an electrical current with an energy generator supported within a housing of the vaporizing device by rotating an energy generator supported within the housing to produce the electrical current. Further, in any embodiments of the methods disclosed, rotating the energy generator one revolution can cause the energy generator to rotate at least two revolutions, or at least four revolutions, or from four to eight (or more) revolutions. The method can further include storing energy generated by the energy generator in a capacitor or a supercapacitor that can be in electrical communication with the energy generator and the atomizer for selective discharge to the atomizer. The method of any embodiments disclosed herein can further include storing the liquid that can be supplied to the atomizer within a tank, and/or producing an electrical current with an energy generator supported within a housing of the vaporizing device by passing a magnet through a solenoid.

Figure 6:
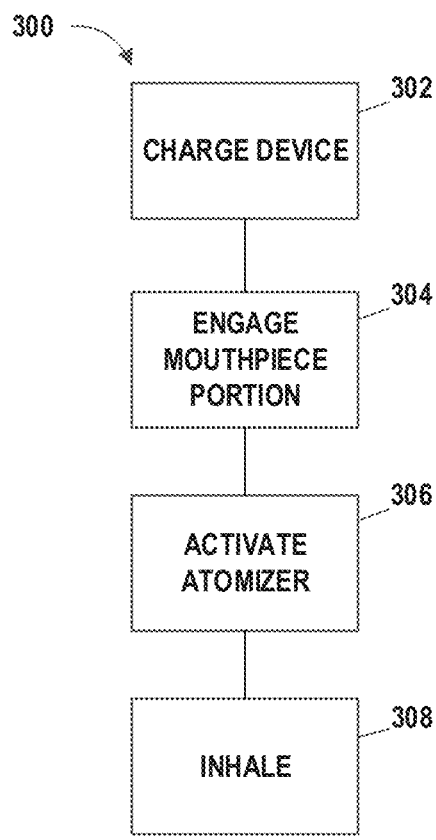
FIG. 6 is a flowchart showing some of the steps in an embodiment of a method for using a manually powered vaporizing device.

In some embodiments, with reference to FIG. 6, the method 300 of using a manually powered vaporizing device can include the step of charging the device 302 such as by any of the methods or devices disclosed herein, the step of engaging a mouthpiece portion 304 with the user's mouth, the step of activating the atomizer 306, and the step of inhaling the vapor 308.

Any embodiments of the manually powered vaporizing devices disclosed herein, including any of the vaporizing device embodiments 100, 200, can have an inhalation sensor, a temperature sensor, a light, a grinding portion, or any one or any combination of these features and components. The inhalation sensor can be configured to automatically activate the atomizer without the user activating a button or switch such that the atomizer can automatically vaporize the liquid upon inhalation from the user.

Any embodiments of the manually powered vaporizing devices disclosed herein, including any of the vaporizing device embodiments 100, 200, can have a charge indicator 122 to indicate to the user whether the device has a sufficient charge to dispense a draw from the device, and/or to indicate a level of charge of the power source. The charge indicator 122 can be supported by the housing of the device in any desired position. For example, in some embodiments, as shown in FIG. 1, the charge indicator 122 of the device 100 can be positioned in a distal portion of the housing 102 (i.e., closer to the distal end 100b of the device 100). In any other embodiments, as also shown in FIG. 1, the charge indicator 122 can be positioned in a proximal portion of the housing 102 (i.e., closer to the proximal end 100a of the device 100), or anywhere in between. The device can be configured to have only one charge indicator 122. The two charge indicators 122 are shown in FIG. 1 to illustrate alternative positions of the charge indicator 122 only and not to describe that the device must have two charge indicators.

For example and without limitation, in some embodiments, the charge indicator can have a single LED light or other light that emits red when the level of charge of the power source is insufficient to dispense a draw from the device, and/or emits green when the level of charge of the power source is sufficient to dispense a draw from the device. In other embodiments, the charge indicator can have a single LED light or other light that emits a first color (such as, without limitation, red) when the level of charge of the power source is insufficient to dispense a draw from the device, emits a second color (such as, without limitation, yellow) when the level of charge of the power source is sufficient to dispense at least one draw from the device or where the level of charge of the power source is greater than a first predetermined value (such as, without limitation, 20% of full capacity, 30% of full capacity, or 40% of full capacity) but below a second predetermined value (such as, without limitation, 70% of full capacity, 80% of full capacity, or 90% of full capacity), or any combination of any of the foregoing first predetermined values and the second predetermined values, and emits a third color (such as, without limitation, green) when the level of charge of the power source is above a third predetermined value (such as, without limitation, 70% of full capacity, 80% of full capacity, or 90% of full capacity), or otherwise. In other embodiments, the power indicator or charge indicator 122 can be configured to indicate a level of charge of the power source by, for example and without limitation, emitting slow or rapid blinking light, wherein a greater rate of blinking (such as the number of blinks per second) indicates a greater level of charge of the power source.

Optionally, the charge indicator 122 can have a pair of contact buttons or points configured to conduct electrical energy between the two contact points when the contact buttons are pressed. When the electrical energy begins to flow, the electrical energy can be converted to thermal energy which can flow through a conductive layer of the charge indicator 122 and can increase the temperature of one or more regions of thermochromic or temperature activated ink, the appearance of which can indicate a level of charge of the energy storage component 116. In some embodiments, the charge indicator 122 can be positioned adjacent to or near to 104, as is shown in FIG. 2. In other embodiments, the charge indicator 122 can be positioned closer to a distal end portion 100b of the device 100, as shown in FIG. 1.

Any embodiments of the vaporizing devices disclosed herein, including without limitation the vaporizing devices 100 or 200 can have a manual actuator (such as, without limitation, the button 106) or an automatic actuator. Examples of manual actuators that can be used with any of the device embodiments disclosed herein to activate the vaporizing element can include a button, a switch, a dial, or other switch or button type feature. Optionally, the device can have a pressure activated button or switch positioned on or adjacent to a mouthpiece or outlet portion of the device body, wherein a pressure exerted by a user's mouth or lips can activate the vaporizing element. Examples of automatic actuators that can be used with any of the device embodiments disclosed herein to activate the vaporizing element can include a fluidic pressure sensor, a fluid pressure differential actuated switch, an inhalation sensor, an airflow sensor, or other suitable actuators. Examples of manual actuators include a switch, a dial, a button, or suitable switch type devices.

Additionally, as environmental impacts from non-biodegradable plastics and materials become increasingly significant, the need for alternative, biodegradable materials in disposable consumer products becomes increasingly important. In any embodiments disclosed herein, the housing 102, 202 and any other suitable components of the devices 100, 200 can be made from one or more biodegradable materials to lessen the impact resulting from the disposal of vaporizing devices and enable users to responsibly discard of used/non-usable devices. Making vaporizing devices using materials that safely biodegrade will reduce the environmental impacts of such devices.

The material for the housing and/or other components can include biodegradable plastic composed of bio-plastics preferably made from renewable raw materials, such as corn starch. Optionally, in some embodiments of the device can have a housing comprising only polylactide acid (PLA), or comprising PLA and/or other materials which can be biodegradable or bio-plastic. Other examples of plastic material that can be used in whole or in part with any other materials disclosed herein, where feasible, include polyhydroxalkanoate (PHA), Polyamide 11, Polyhydroxyalkanoate, Bio-derived polyethylene, Starch-based plastics, cellulose-based plastics, protein-based plastics, and/or lipid-derived polymers. Additionally, any components can optionally be made in whole or in any combination of photodegradable, oxydegradable, biodegradable, and/or bio-plastic materials.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a sub combination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±10%). For example, "about 7 mm" includes "7 mm" and numbers and ranges preceded by a term such as "about" or "approximately" should be interpreted as disclosing numbers and ranges with or without such a term such that this application supports claiming the number and ranges disclosed in the specification and/or claims with or without the term such as "about" or "approximately" before such numbers or ranges. Phrases preceded by a term such as "substantially" include the recited phrase and should be interpreted based on the circumstances (e.g., as much as reasonably possible under the circumstances). For example, "substantially straight" includes "straight."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

What is claimed is:

1. A manually powered vaporizing device, comprising:
   a housing having an outside surface and an opening passing through the outside surface of the housing;
   a tank having a fillable space therein;
   an atomizer;
   an air passageway through at least a portion of the housing, the air passageway being in fluid communication with at least the tank, the atomizer, and the opening;
   an energy generator supported by the housing;
   an energy storage component supported by the housing and in electrical communication with the energy generator and the atomizer; and
   a rotating element configured to rotate relative to the housing, the rotating element being coupled with the energy generator such that a rotation of the rotating element causes a rotation of the energy generator;
   wherein:
      a rotation of the energy generator causes the energy generator to produce a first electrical current;
      the energy storage component is configured to store energy that is produced by the energy generator and to selectively discharge a second electrical current to the atomizer;
      the atomizer is configured to use the second electrical current to vaporize a liquid from the tank into a vapor that can be withdrawn through the opening; and
      the rotating element has an outside surface having a profile shape that matches a profile shape of the outside surface of the housing.

2. The device of claim 1, further comprising a gear box coupled with the energy generator, the gear box being configured to increase a number of revolutions of the energy generator relative rotations of the rotating element.

3. The device of claim 2, wherein the gear box is configured such that one revolution of the rotating element can result in approximately two or more revolutions of the energy generator.

4. The device of claim 3, wherein the gear box is configured such that one revolution of the rotating element can result in approximately three to approximately eight revolutions of the energy generator.

5. The device of claim 1, wherein the atomizer comprises at least one of an ultrasonic vibration atomizer and a heating element.

6. The device of claim 1, wherein the energy generator comprises a stepper motor.

7. The device of claim 1, wherein the energy storage component comprises a capacitor or a supercapacitor.

8. The device of claim 1, wherein the housing is made from a biodegradable material.

9. The device of claim 1, further comprising a means for actuating the atomizer.

10. A method of using the manually powered vaporizing device of claim 1, comprising:
    producing the first electrical current with the energy generator supported within the housing of the vaporizing device;
    discharging the electrical current to the atomizer to vaporize the liquid within the atomizer to create the vapor; and
    withdrawing the vapor through the opening in the housing.

11. The method of claim 10, further comprising rotating the energy generator supported within the housing to produce the electrical current.

12. The method of claim 10, wherein the device is configured such that rotating the rotating element one revolution causes the energy generator to rotate at least four revolutions.

13. The method of claim 10, further comprising storing energy generated by the energy generator in a capacitor or a supercapacitor that is in electrical communication with the energy generator and the atomizer for selective discharge to the atomizer.

14. The method of claim 10, further comprising producing an electrical current with an energy generator supported within a housing of the vaporizing device by passing a magnet through a solenoid.

\* \* \* \* \*